United States Patent
Osada et al.

(10) Patent No.: US 10,801,568 B2
(45) Date of Patent: Oct. 13, 2020

(54) DISC BRAKE

(71) Applicant: HITACHI AUTOMOTIVE SYSTEMS, LTD., Ibaraki (JP)

(72) Inventors: Takahito Osada, Nishiyatsushiro-gun (JP); Yoshihiro Nakamura, Chino (JP)

(73) Assignee: HITACHI AUTOMOTIVE SYSTEMS, LTD., Ibaraki (JP)

( * ) Notice: Subject to any disclaimer, the term of this patent is extended or adjusted under 35 U.S.C. 154(b) by 0 days.

(21) Appl. No.: 15/740,579

(22) PCT Filed: Jun. 21, 2016

(86) PCT No.: PCT/JP2016/068320
§ 371 (c)(1),
(2) Date: Dec. 28, 2017

(87) PCT Pub. No.: WO2017/002657
PCT Pub. Date: Jan. 5, 2017

(65) Prior Publication Data
US 2018/0195568 A1 Jul. 12, 2018

(30) Foreign Application Priority Data
Jun. 30, 2015 (JP) .................................. 2015-131325

(51) Int. Cl.
*F16D 65/092* (2006.01)
*F16D 55/225* (2006.01)
(Continued)

(52) U.S. Cl.
CPC .......... *F16D 65/092* (2013.01); *F16D 55/225* (2013.01); *F16D 55/226* (2013.01);
(Continued)

(58) Field of Classification Search
CPC ............... F16D 65/092; F16D 65/0006; F16D 69/0408; F16D 55/225; F16D 55/226
(Continued)

(56) References Cited

U.S. PATENT DOCUMENTS 3,184,005 A * 5/1965 Thirion ............... F16D 55/2255
188/73.43
4,220,223 A * 9/1980 Rinker ............. F16D 55/22655
188/250 B
(Continued)

FOREIGN PATENT DOCUMENTS

JP 10-122277 5/1998
JP 2009-097600 5/2009
(Continued)

OTHER PUBLICATIONS

International Search Report dated Aug. 2, 2016 in International Application No. PCT/JP2016/068320.
(Continued)

*Primary Examiner* — Thomas J Williams
(74) *Attorney, Agent, or Firm* — Wenderoth, Lind & Ponack, L.L.P.

(57) ABSTRACT

A disk brake includes a caliper, an inner pad and an outer pad that press a disk, a piston pressing the inner pad, and a claw portion pressing the outer pad. The inner pad includes a first surface that contacts the disk when the inner pad presses the disk and a second surface opposite to the first surface. The second surface has a first hole. The outer pad includes a third surface that contacts the disk when the outer pad presses the disk and a fourth surface opposite to the third surface. The fourth surface has a second hole. The first hole and the second hole are disposed so that, when the inner pad is projected onto the outer pad in the axial direction of the disk,
(Continued)

the gravity center of the first hole and the gravity center of the second hole are offset relative to each other.

4 Claims, 8 Drawing Sheets

(51) Int. Cl.
    *F16D 55/226*     (2006.01)
    *F16D 65/00*     (2006.01)
    *F16D 69/00*     (2006.01)
    *F16D 69/04*     (2006.01)
    *F16D 55/00*     (2006.01)
    *F16D 121/04*     (2012.01)

(52) U.S. Cl.
    CPC .......... *F16D 65/0068* (2013.01); *F16D 69/00* (2013.01); *F16D 69/0408* (2013.01); *F16D 2055/0016* (2013.01); *F16D 2121/04* (2013.01)

(58) Field of Classification Search
    USPC .... 188/73.1, 250 R, 253, 261, 250 E, 250 F, 188/250 G, 250 B
    See application file for complete search history.

(56) References Cited

U.S. PATENT DOCUMENTS

| | | | | |
|---|---|---|---|---|
| 4,887,696 | A | * | 12/1989 | Redenbarger ..... F16D 55/22655 188/73.45 |
| 4,914,801 | A | * | 4/1990 | Sweetmore ........... F16D 65/092 29/469.5 |
| 5,464,077 | A | * | 11/1995 | Thiel ..................... F16D 55/227 188/72.5 |
| 2016/0025163 | A1 | | 1/2016 | Inokuchi et al. |
| 2016/0131208 | A1 | * | 5/2016 | Misumi ................... F16D 65/12 188/73.1 |
| 2017/0159736 | A1 | * | 6/2017 | Meggiolan .............. B62L 1/005 |

FOREIGN PATENT DOCUMENTS

| | | | |
|---|---|---|---|
| WO | 2014/141995 | 9/2014 | |
| WO | 2014/207530 | 12/2014 | |
| WO | WO-2014207530 A2 * | 12/2014 | ............. F16D 65/12 |

OTHER PUBLICATIONS

Office Action dated Jul. 4, 2020 in corresponding Indian Patent Application No. 201717047093, with English Translation.

* cited by examiner

DISC BRAKE

TECHNICAL FIELD

The present invention relates to disk brakes that apply braking force to vehicles.

BACKGROUND ART

A disk brake provided in a vehicle, e.g. an automobile, is configured to include a caliper formed to extend over the outer periphery side of a disk rotating together with a wheel, an inner pad (inner friction pad) pressing the disk from the inside (inner side) of the caliper, an outer pad (outer friction pad) pressing the disk from the outside (outer side) of the caliper, a piston pressing the inner pad, and a claw portion pressing the Outer pad (Patent Literature 1).

Here, PTL1 describes a technique in which a shim plate is provided between the piston and the inner pad and a cut-out portion is provided in a region of the shim plate that abuts against the piston, thereby adjusting the surface pressure to be applied to the inner pad from the piston.

CITATION LIST

Patent Literature

PTL 1: Japanese Patent Application Laid-Open Publication No. H10-122277

SUMMARY OF INVENTION

Technical Problem

According to PTL1, it is deemed that the gravity center position of the area of contact between the inner pad and the piston (i.e. the gravity center position of the abutting surface) can be adjusted by adjusting the shape of the cut-out portion in the shim plate. However, this configuration is likely to lead to an increase in cost and a reduction in productivity (ease of production) due to the need for a shim plate provided with a cut-out portion.

An object of the present invention is to provide a disk brake capable of reducing cost and of improving productivity.

Solution to Problem

To solve the above-described problem, a disk brake according to one embodiment of the present invention includes a caliper formed to extend over an outer periphery side of a disk rotating together with a wheel, an inner pad and an outer pad which are configured to press the disk, a piston configured to press the inner pad, and a claw portion configured to press the outer pad. The inner pad includes a first surface that contacts the disk when the inner pad presses the disk. The inner pad further includes a second surface opposite to the first surface. The second surface includes at least one first hole. The outer pad includes a third surface that contacts the disk when the outer pad presses the disk. The outer pad further includes a fourth surface opposite to the third surface. The fourth surface includes at least one second hole. The at least one first hole and the at least one second hole are disposed so that, when the inner pad is projected onto the outer pad in an axial direction of the disk, a center of gravity of the at least one first hole and a center of gravity of the at least one second hole are offset relative to each other.

The disk brake according to the one embodiment of the present invention is capable of reducing cost and of improving productivity.

DESCRIPTION OF EMBODIMENTS

Disk brakes according to embodiments will be explained below in detail with reference to the accompanying drawings.

Figure 1:
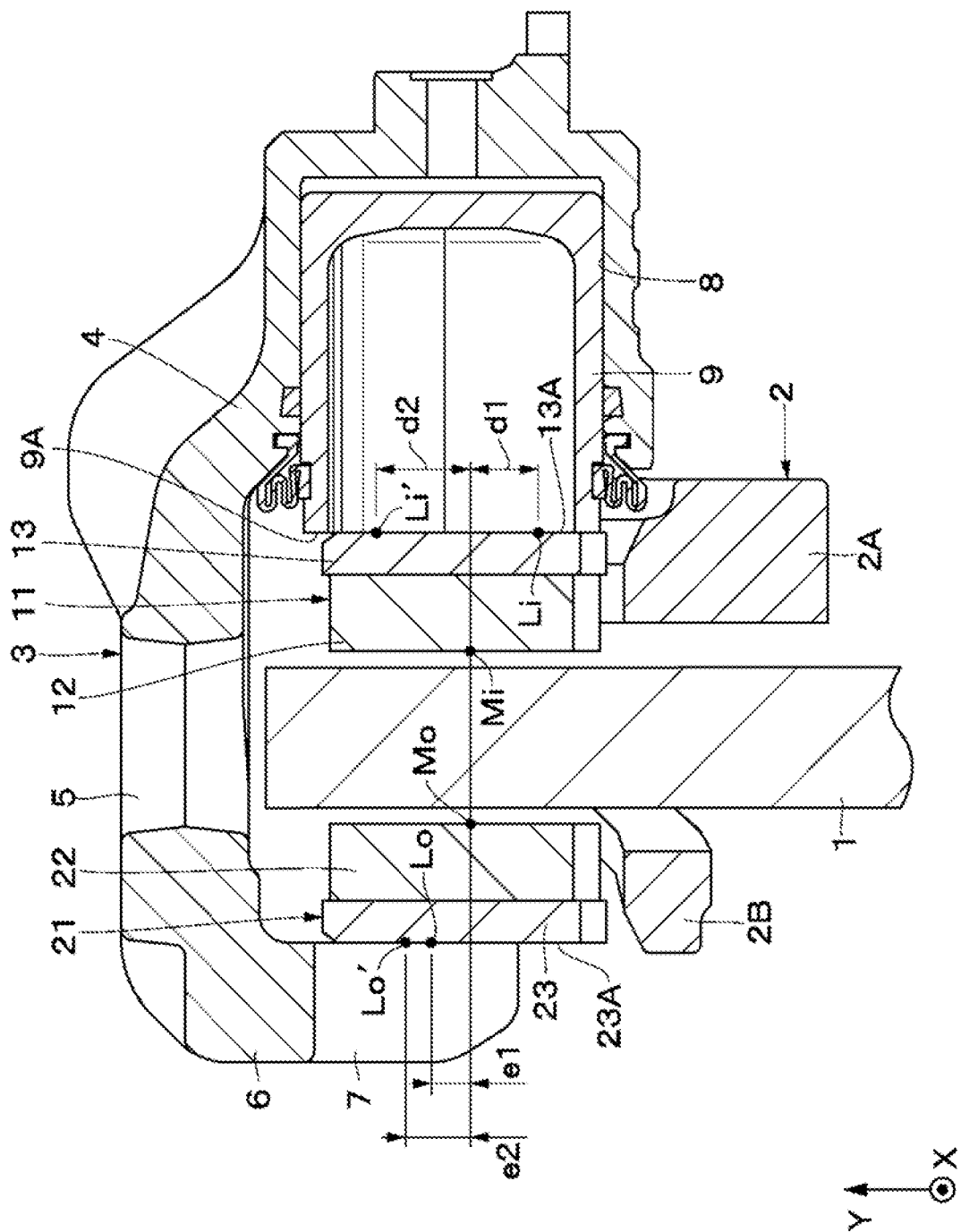
FIG. 1 is a vertical sectional view showing a disk brake according to a first embodiment.

FIGS. 1 to 9 show a first embodiment. In FIG. 1, a disk 1 rotates together with a wheel (not shown). A mounting member 2, which is known as carrier, is secured to a non-rotating part (not shown) of a vehicle at a position in the vicinity of the disk 1. The mounting member 2 is formed to extend over the outer periphery side of the disk 1 in an axial direction of the disk 1 (i.e. the right-and-left direction in FIGS. 1, 4 and 7, or the obverse-and-reverse direction in FIGS. 2, 3, 5, 6, 8 and 9, which is referred to as "the disk axial direction" in the present application).

The mounting member 2 is configured to include a pair of arm portions (not shown), a support portion 2A, and a reinforcing beam 2B. The arm portions are spaced apart from each other in a rotational direction of the disk 1 (i.e. the obverse-and-reverse direction in FIGS. 1, 4 and 7, or the right-and-left direction in FIGS. 2, 3, 5, 6, 8 and 9, which is referred to as "the disk rotational direction", "the disk tangential direction", or "the disk circumferential direction" in the present application). The arm portions extend over the outer periphery side of the disk 1 in the axial direction of the disk 1. The arm portions support a caliper 3 through sliding pins (not shown) so that the caliper 3 is slidable in the disk axial direction.

The support portion 2A is provided to integrally connect together the proximal ends (right-hand ends in FIG. 1) the arm portions and secured to the non-rotating part of the vehicle at a position that is at the inner side of the disk. The reinforcing beam 2B connects together the distal ends of the arm portions at a position that is at the outer side of the disk 1. Thus, the arm portions of the mounting member 2 are integrally connected together at the inner side of the disk 1 by the support portion 2A, and are integrally connected together at the outer side of the disk 1 by the reinforcing beam 2B.

The mounting member is provided at the inner side thereof with a pair of pad guides (not shown) guiding an inner pad 11, which is an inner friction pad, in the disk axial direction. The pad guides are each formed, for example, in the shape of a U-groove with a U-shaped sectional configuration (generally U-shaped sectional configuration) extending in the disk axial direction. The pad guides are spaced apart from each other to be located at one side and the other side, respectively, which face each other across the inner pad 11 in the disk rotational direction. The pad guides respectively include lug portion 14 and 15 of the inner pad 11 fitted (inserted) therein with pad springs (not shown) interposed therebetween, for example.

Also at the outer side thereof, the mounting member 2 is provided with a pair of pad guides (not shown) guiding an outer pad 21, which is an outer friction pad, in the disk axial direction. The pad guides are each formed, for example, in the shape of a U-groove with a U-shaped sectional configuration (generally U-shaped sectional configuration) extending in the disk axial direction in the same way as the inner-side pad guides. The pad guides are spaced apart from each other to be located at one side and the other side, respectively, which face each other across the outer pad 21 in the disk rotational direction. The pad guides respectively include lug portions 24 and 25 of the outer pad 21 fitted (inserted) therein with pad springs (not shown) interposed therebetween, for example.

The caliper 3 is attached to the mounting member 2 (through sliding pins) movably (slidingly displaceably) in the disk axial direction. The caliper 3 is formed to extend over the outer periphery side of the disk 1 in the disk axial direction. The caliper 3 is configured to include an inner leg portion 4, a bridge portion 5, and an outer leg portion 6.

The inner leg portion 4 is provided at the inner side, i.e. one side, in the disk axial direction. The bridge portion 5 as a bridge is provided to extend from the inner leg portion 4 to the outer side, i.e. the other side, in the disk axial direction over the outer periphery side of the disk 1 between the arm portions of the mounting member 2. The outer leg portion 6 extends radially (up-and-down direction in FIGS. 1 to 9, which is referred to as "the disk radial direction" in the present application) inward (downward in FIGS. 1 to 9) of the disk 1 from the outer side, i.e. the distal end of the bridge portion 5. The outer leg portion 6 includes a bifurcated claw portion 7 at the distal end thereof. The claw portion 7 abuts against a plate 23 of the outer pad 21 directly (i.e. without an intervening member, e.g. a shim plate, interposed between the claw portion 7 and the plate 23). The claw portion 7, when the brake is activated (during braking), presses the outer pad 21 toward the outer side surface (left-hand side surface in FIG. 1) of the disk 1.

The inner leg portion 4 of the caliper 3 is provided with a single cylinder 8 to constitute a single-bore structure, for example. A piston 9 is slidably fitted in the cylinder 8. The cylinder 8 is supplied therein with a brake fluid pressure from the outside when the brake is activated. Further, the inner leg portion 4 is integrally provided with a pair of pin mounting portions (not shown) projecting in the disk rotational direction. The pin mounting portions support the whole caliper 3 through the sliding pins to be slidably relative to the arm portions of the mounting member 2.

The piston 9 is formed in the shape of a bottomed cylinder and slidably fitted in the cylinder 8 in the inner leg portion 4. The piston 9 directly (i.e., without an intervening member, e.g. a shim plate, interposed between the piston 9 and the plate 13) abuts at an opening end surface 9A, which is a distal end thereof, against a plate 13 of the inner pad 11. The piston 9, when the brake is activated, presses the inner pad 11 toward the inner side surface (right-hand side surface in FIG. 1) of the disk 1.

That is, when the brake fluid pressure is supplied into the cylinder 8 from the outside, the piston 9 is slidingly displaced in the disk axial direction toward the disk 1 by the supplied fluid pressure, thereby pressing the inner pad 11 toward the one side surface (inner side surface) of the disk 1. At this time, the caliper 3 receives pressing counterforce from the disk 1. Consequently, the whole caliper 3 is glidingly displaced toward the inner side relative to the arm portions of the mounting member 2, and the claw portion 7 presses the outer pad 21 against the other side surface (outer side surface) of the disk 1. Thus, braking force can be applied to the disk 1 and hence to the wheel.

Figure 2:
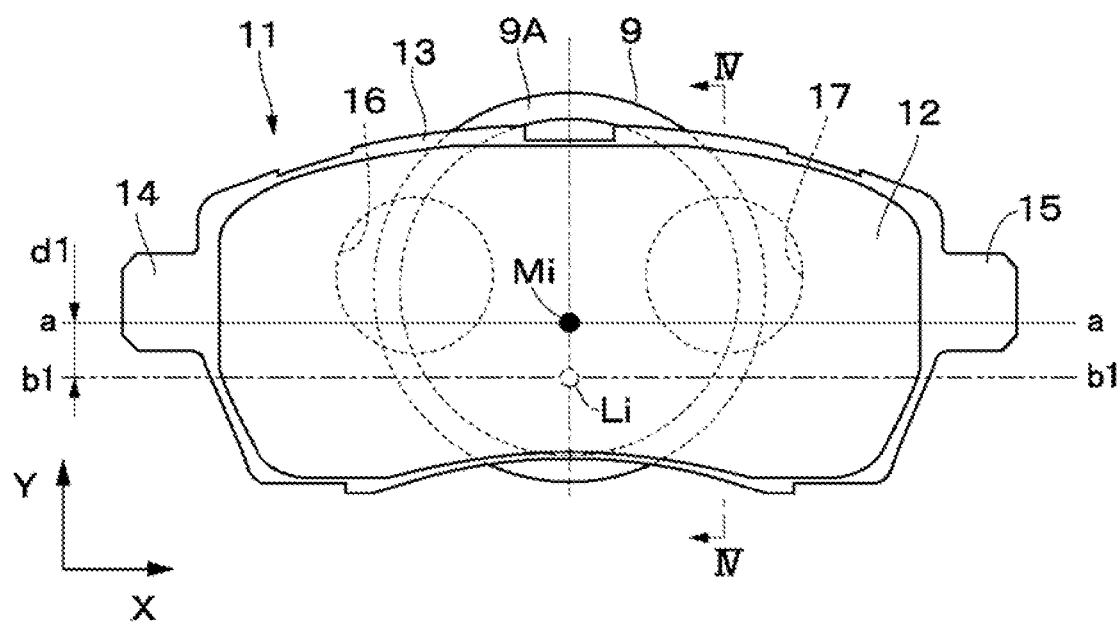
FIG. 2 is a side view of an inner pad as viewed from an outer side (left-hand side of FIG. 1) which is a lining side.
Figure 3:
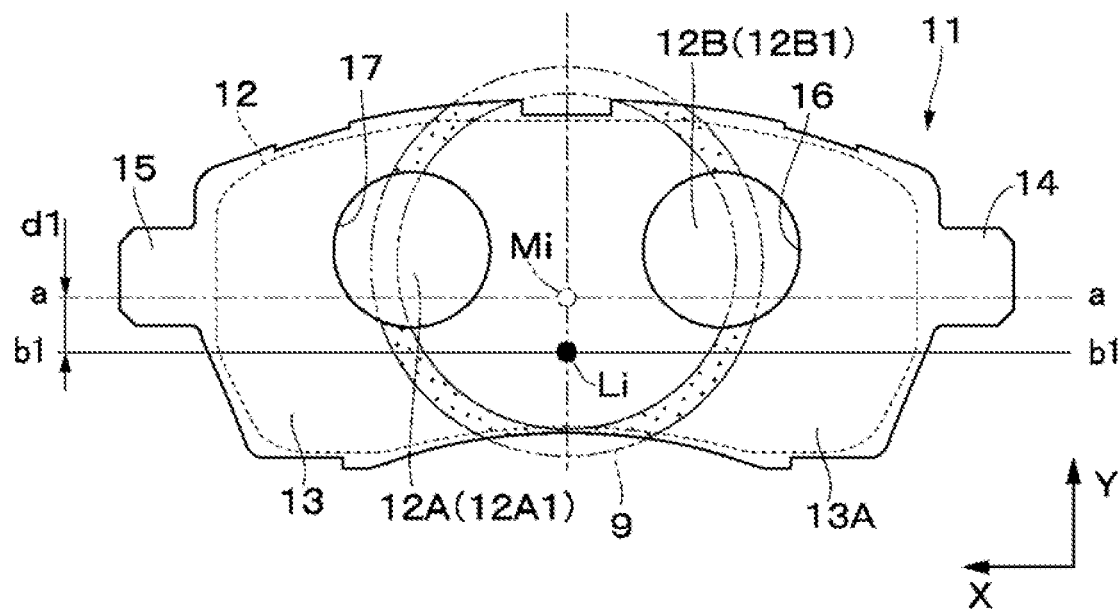
FIG. 3 is a side view of the inner pad as viewed from an inner side (right-hand side of FIG. 1) which is a plate side.
Figure 4:
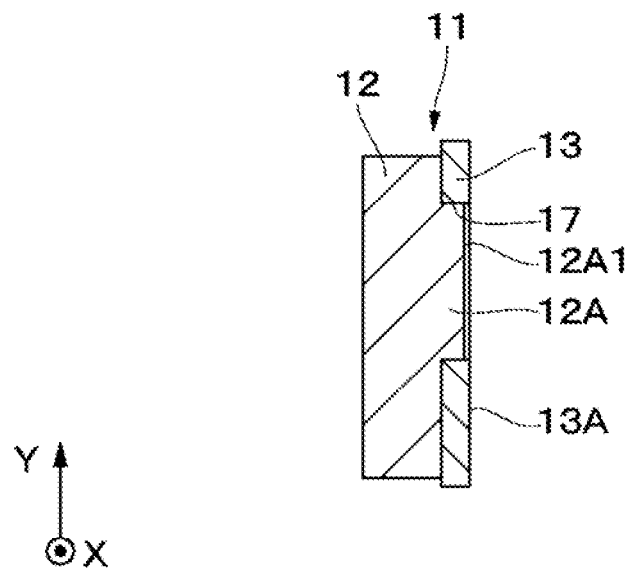
FIG. 4 is a sectional view of the inner pad as viewed from the IV-IV direction in FIG. 2.
Figure 5:
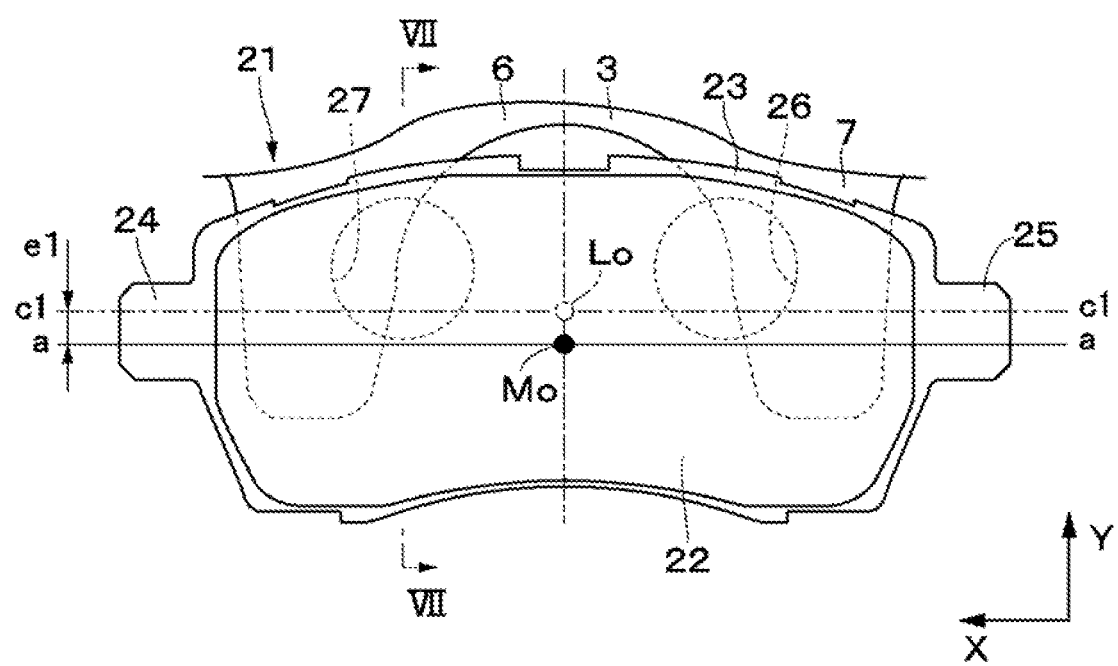
FIG. 5 is a side view of an outer pad as viewed from an inner side (right-hand side of FIG. 1), which is a lining side.
Figure 6:
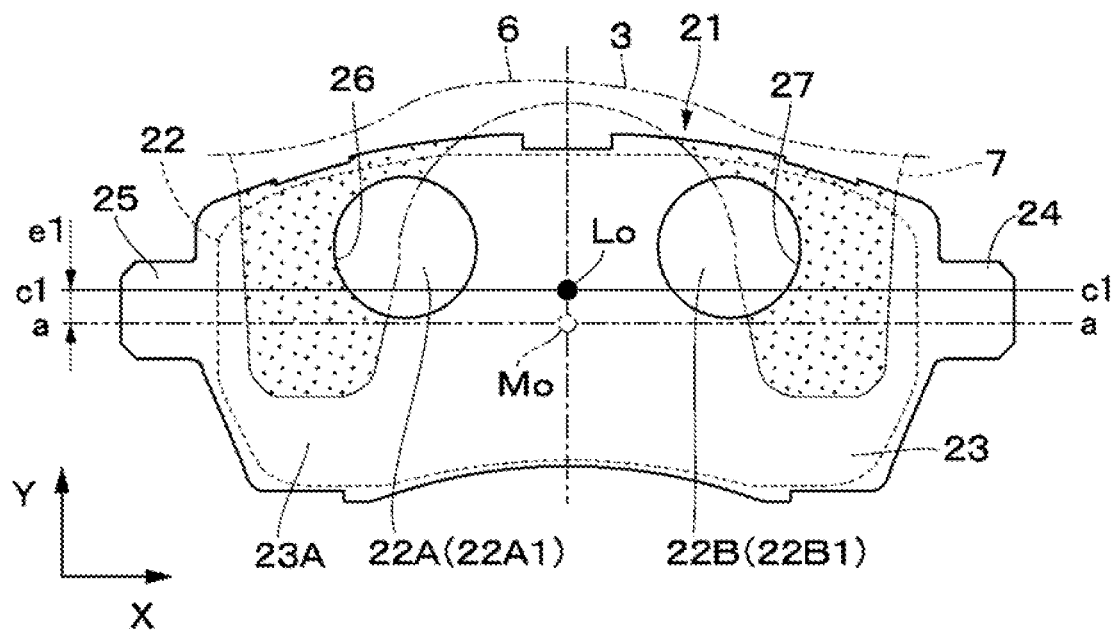
FIG. 6 is a side view of the outer pad as viewed from an outer side (left-hand side of FIG. 1), which is a plate side.
Figure 7:
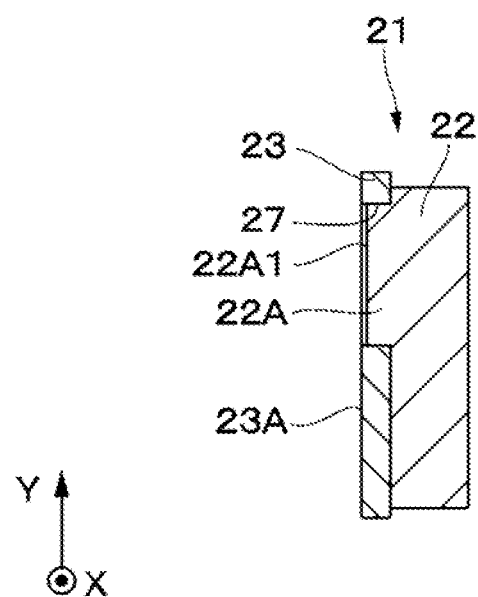
FIG. 7 is a sectional view of the outer pad as viewed from the direction in FIG. 5.
Figure 8:
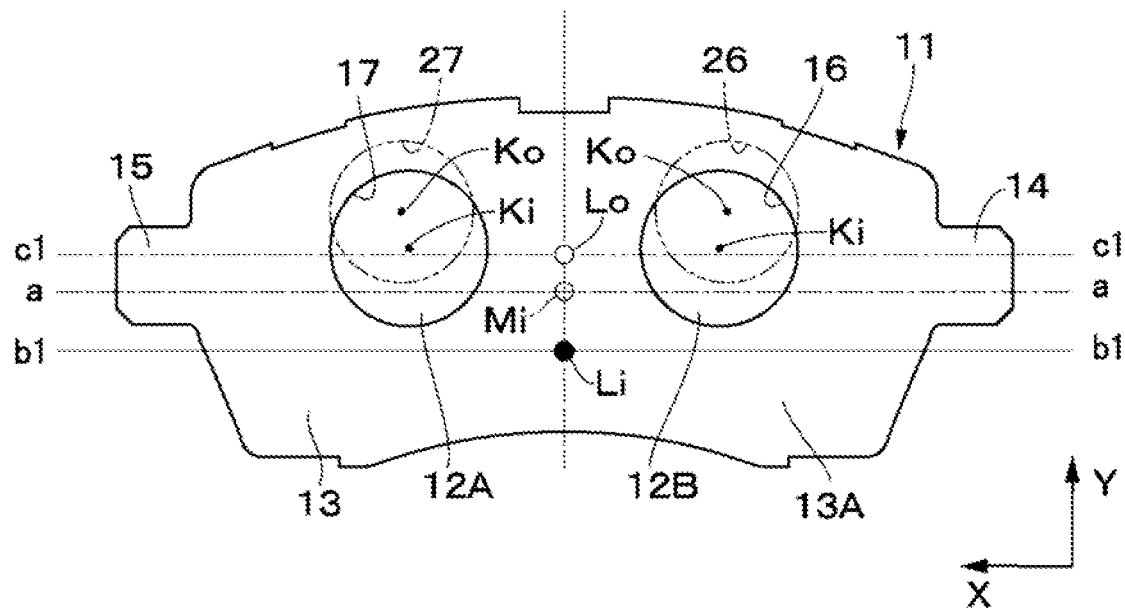
FIG. 8 is a side view showing second holes in the outer pad as projected onto the inner pad.
Figure 9:
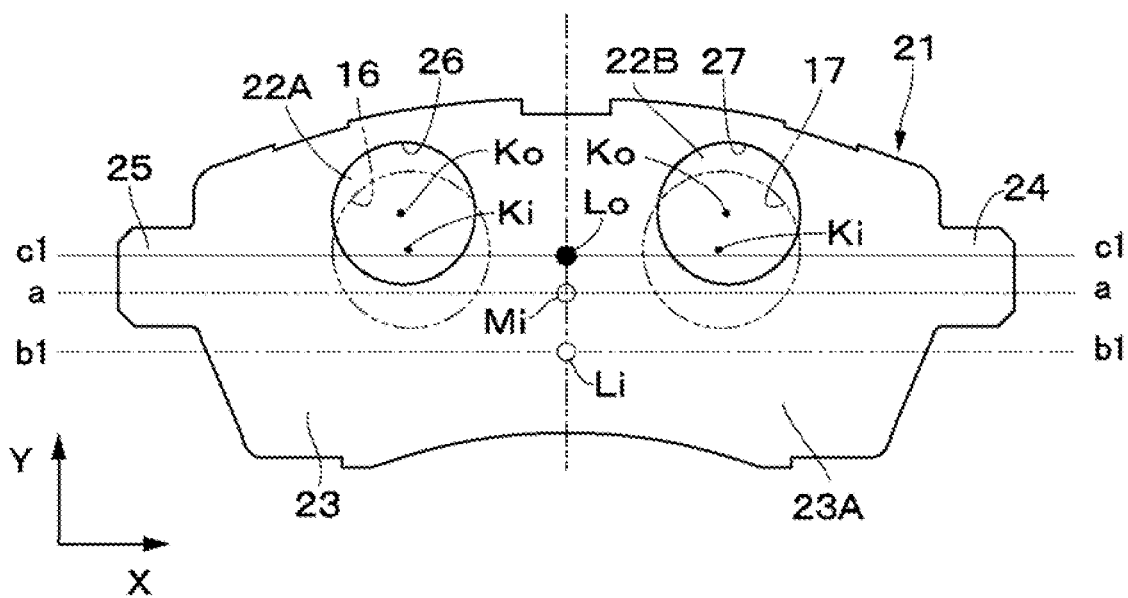
FIG. 9 is a side view showing first holes in the inner pad as protected onto the outer pad.

Next, the inner pad 11 and the outer pad 21, which are friction pads, will be explained with reference to FIGS. 2 to 9 in addition to FIG. 1. FIGS. 2 to 4 show the inner pad 11, and FIGS. 5 to 7 show the outer pad 21. Further, FIG. 8 shows through-holes 26 and 27 in the outer pad 21 as projected onto the inner pad 11 in the disk axial direction. FIG. 9 shows through-holes 16 and 17 in the inner pad 11 as projected onto the outer pad 21 in the disk axial direction. The inner pad 11 and the outer pad 21 are the same in configuration (e.g. the same constituent material, the same shape, the same thickness dimension, and the same width dimension) except that the positions of the through-holes 16 and 17 in the inner pad 11 and the positions of the through-holes 26 and 27 in the outer pad 21 differ from each other.

The inner pad 11 and the outer pad 21 are disposed to face the axially opposite sides, respectively, of the disk 1. The inner pad 11 and the outer pad 21 are attached to the mounting member 2 movably in the disk axial direction. The inner pad 11 is pressed against the disk 1 by the piston 9, and the outer pad 21 is pressed against the disk 1 by the claw portion 7. That is, the inner pad 11 presses the disk 1 from the inside (one side in the disk axial direction), which is the inner side of the caliper 3, and the outer pad 21 presses the disk 1 from the outside (the other side in the disk axial direction), which is the outer side of the caliper 3.

As shown in FIGS. 2 to 4, the inner pad 11 is configured to include a lining 12 as a friction member coming into frictional contact with a surface (one side surface in the axial direction) of the disk 1, and a plate (backing plate) 13 provided on a surface of the inner pad 11 opposite to the lining 12 in the disk axial direction. In this case, the lining 12 is fixed (bonded) to the plate 13, which is a flat plate extending in the disk rotational direction.

The plate 13 is formed of a metal or a resin (synthetic resin), for example, and includes lug portions 14 and 15 as jutting projections respectively provided on the opposite side edges thereof in the disk rotational direction. The lug portions 14 and 15 are spaced apart from each other in the disk rotational direction. The lug portions 14 and 15 are slidably inserted (fitted) in the pad guides, respectively, of the mounting member 2 with pad springs interposed therebetween. The lug portions 14 and 15 are configured to receive rotational torque (braking torque) when the brake of the vehicle is activated. That is, the lug portions 14 and 15 constitute torque transmission portions that transmit rotational torque that the lining 12 receives from the disk 1 to the associated pad guides of the mounting member 2.

Further, the plate 13 is provided with a pair of through-holes 16 and 17 spaced apart from each other in the disk rotational direction. The through-holes 16 and 17 are arranged in symmetry with respect to the center in the disk rotational direction of the inner pad 11 (plate 13) (i.e. in line symmetry with respect to a line passing through the center and parallel to the Y axis). Further, the through-holes 16 and 17 are each formed as a circular hole extending through the plate 13 in the disk axial direction. The through-holes 16 and 17 serve as holes for venting gas from the lining 12 when the lining 12 and the plate 13 are fixed to each other, i.e. when the lining 12 is contact-bonded to the plate 13 by pressing the former against the latter (the holes will hereinafter be referred to as "the gas vent holes").

As shown in FIG. 4, when the lining 12 and the plate 13 are fixed to each other, the lining 12 partly enters (bites into) the through-holes 16 and 17 in the form of projections 12A and 12B. In this case, end surfaces 12A1 and 12B1 of the projections 12A and 12B of the lining 12 are located closer to the disk 1 than a side surface 13A of the plate 13. Thus, a difference in level is provided between each of the end surfaces 12A1 and 12B1 of the projections 12A and 12B of the lining 12 and the side surface 13A of the plate 13.

Accordingly, the opening end surface 9A of the piston 9, which presses the inner pad 11, does not contact regions of the side surface 13A of the plate 13 of the inner pad 11 at which the through-holes 16 and 17 are formed, but contacts regions of the side surface 13A other than the through-holes 16 and 17. That is, the opening end surface 9A of the piston 9 contacts the plate 13 of the inner pad 11 at regions marked with the dot patterns in FIG. 3. Thus, the inner pad 11 has a pair (two) of through-holes 16 and 17 as first holes provided in a surface (side surface 13A of the plate 13) on a side thereof that does not contact the disk 1.

As shown in FIGS. 5 to 7, the outer pad 21 is configured to include a lining 22 as a friction member coming into frictional contact with a surface (the other side surface in the axial direction) of the disk 1, and a plate (backing plate) 23 provided on a surface of the outer pad 21 opposite to the lining 22 in the disk axial direction, in the same way as the inner pad 11. In this case, the lining 22 is fixed (bonded) to the plate 23, which is a flat plate extending in the disk rotational direction.

In the same way as the plate 13 of the inner pad 11, the plate 23 of the outer pad 21 is formed of a metal or a resin (synthetic resin), for example, and includes lug portions 24 and 25 as jutting projections respectively provided on the opposite side edges thereof in the disk rotational direction, and the lug portions 24 and 25 are spaced apart from each other in the disk rotational direction. The lug portions 24 and 25 are slidably inserted (fitted) in the pad guides, respectively, of the mounting member 2 with pad springs interposed therebetween. The lug portions 24 and 25 are configured to receive rotational torque (braking torque) when the brake of the vehicle is activated. That is, the lug portions 24 and 25 constitute torque transmission portions that transmit rotational torque that the lining 22 receives from the disk 1 to the associated pad guides of the mounting member 2.

Further, the plate 23 is provided with a pair of through-holes 26 and 27 spaced apart from each other in the disk rotational direction. The through-holes 26 and 27 are arranged in symmetry with respect to the center in the disk rotational direction of the outer pad 21 (plate 23) (i.e. in line symmetry with respect to a line passing through the center and parallel to the Y axis). Further, the through-holes 26 and 27 are each formed as a circular hole extending through the plate 23 in the disk axial direction. The through-holes 26 and 27 serve as gas vent holes for venting gas from the lining 22 when the lining 22 and the plate 23 are fixed to each other, i.e. when the lining 22 is contact-bonded to the plate 23 by pressing the firmer against the latter.

As shown in FIG. 7, when the lining 22 and the plate 23 are fixed to each other, the lining 22 partly enters (bites into) the through-holes 26 and 27 in the for of projections 22A and 22B. In this case, end surfaces 22A1 and 22B1 of the projections 22A and 22B of the lining 22 are located closer to the disk 1 than a side surface 23A of the plate 23. Thus, a difference in level is provided between each of the end surfaces 22A1 and 22B1 of the projections 22A and 22B of the lining 22 and the side surface 23A of the plate 23.

Accordingly, the claw portion 7 of the caliper 3, which presses the outer pad 21, does not contact regions of the side surface 23A of the plate 23 of the outer pad 21 at which the through-holes 26 and 27 are formed, but contacts regions of the side surface 23A other than the through-holes 26 and 27. That is, the claw portion 7 contacts the plate 13 of the inner pad 11 at regions marked with the dot patterns in FIG. 6. Thus, the outer pad 21 has a pair (two) of through-holes 26 and 27 as second holes provided in a surface (side surface 23A of the plate 2) on a side thereof that does not contact the disk 1.

The embodiment is arranged such that, as shown in FIGS. 8 and 9, when the inner pad 11 is projected onto the outer pad 21 in the disk axial direction, the gravity centers (centroids, or centers) Ki, Ki of the through-holes 16 and 17 as first holes and the gravity centers (centroids, or centers) Ko, Ko of the through-holes 26 and 27 as second holes are respectively offset relative to each other. That is, the through-holes 16 and 17 and the through-holes 26 and 27 are provided so that the gravity centers Ki and Ko are offset (not coincident) relative to each other when the inner pad 11 is projected onto the outer pad 21 (or the outer pad 21 is projected onto the inner pad 11) in the disk axial direction in a state where the inner pad 11 and the outer pad 21 are attached to the mounting member 2.

In FIG. 8, the inner pad 11 (plate 13 thereof) is shown by the solid line, and the through-holes 26 and 27 in the outer pad 21 when the inner pad 11 and the outer pad 21 are projected in the disk axial direction are shown by the two-dot chain line. In FIG. 9, on the other hand, the outer ad 21 (plate 23 thereof) is shown by the solid line, and the through-holes 16 and 17 in the inner pad 11 when the outer pad 21 and the inner pad 11 are projected in the disk axial direction are shown by the two-dot chain line.

In the embodiment, the gravity center position (centroid position, or center position) Li of the contact area (regions marked with the dot patterns in FIG. 3) between the inner pad 11 and the piston 9 (opening end surface 9A thereof) and the gravity center position (centroid position, or center position) Lo of the contact area (regions marked with the dot patterns in FIG. 6) between the outer pad 21 and the claw portion 7 can be adjusted as desired according to the amount of offset between the gravity centers Ki, Ki of the through-holes 16 and 17 as first holes and the gravity centers Ko, Ko of the through-holes 26 and 27 as second holes. Thus, the embodiment can adjust, as desired, the gravity center position Li of the contact area between the inner pad 11 and the piston 9 and the gravity center position of the contact area between the outer pad 21 and the claw portion 7 without the need to provide an intervening member, e.g. a shim plate, between the inner pad 11 and the piston 9 and another intervening member between the outer pad 21 and the claw portion 7.

Here, a direction that connects the lug portions 14 and 15, which are provided at the opposite sides of the inner pad 11, and a direction that connects the lug portions 24 and 25, which are provided at the opposite sides of the outer pad 21, are each defined as an X axis, and a direction perpendicular to the X axis in a plane of the plate 13 of the inner pad 11 and in a plane of the plate 23 of the outer pad 21 is defined as a Y axis. In other words, the axis in the disk rotational direction is defined as an X axis, and the axis in the disk radial direction is defined as a Y axis. In this case, in the embodiment, the gravity centers Ki, Ki of the through-holes 16 and 17 as first holes are respectively offset in the Y-axis direction relative to the gravity centers Ko, Ko of the through-holes 26 and 27 as second holes.

More specifically, the gravity centers Ko, Ko of the through-holes 26 and 27 as second holes are located closer to the bridge portion 5 side of the caliper 3 in the Y-axis direction (i.e. closer to the upper side in FIGS. 8 and 9) than the gravity centers Ki, Ki of the through-holes 16 and 17 as first holes. Thus, the gravity center position Lo of the contact area between the outer pad 21 and the claw portion 7 and the gravity center position Li of the contact area between the inner pad 11 and the piston 9 can be brought closer to each other in the Y-axis direction. As a result, the lining 22 of the outer pad 21 and the lining 12 of the inner pad 11 are allowed to have the same tendency to wear out.

The following is an explanation of the operation of the disk brake according to the embodiment configured as stated above.

First, when the brake of the vehicle is activated, a brake fluid pressure is supplied into the cylinder 8 of the caliper 3, thereby causing the piston 9 to be slidingly displaced toward the disk 1, whereby the inner pad 11 is pressed against one side surface of the disk 1. At this time, the caliper 3 receives pressing counterforce from the disk 1. Therefore, the whole caliper 3 is slidingly displaced toward the inner side relative to the arm portions of the mounting member 2. Consequently, the claw portion 7 of the caliper 3 presses the outer pad 21 against the other side surface of the disk 1.

Thus, the inner pad 11 and the outer pad 21 can strongly hold the disk 1 rotating together with the wheel therebetween from both sides in the axial direction and can apply braking forces to the disk 1. When the braking operation is canceled, the supply of the fluid pressure to the cylinder 8 is stopped. Consequently, the inner pad 11 and the outer pad 21 separate from the disk 1 and return to their non-braking states.

During the above-described braking operation, the opening end surface 9A of the piston 9 contacts the side surface 13A of the plate 13 of the inner pad 11 at the regions marked with the dot patterns in FIG. 3. That is, the opening end surface 9A of the piston 9 does not contact the regions at which the through-holes 16 and 17 as first holes are formed, but faces the projections 12A and 12B (end surfaces 12A1 and 12B1 thereof) of the lining 12, which enter the through-holes 16 and 17 with a gap.

Meanwhile, the claw portion 7 of the caliper 3 contacts the side surface 23A of the plate 23 of the outer pad 21 at the regions marked with the dot patterns in FIG. 6. That is, the claw portion 7 does not contact the regions at which the through-holes 26 and 27 as second holes are formed, but the projections 22A and 22B (end surfaces 22A1 and 22B1 thereof) of the lining 22, which enter the through-holes 26 and 27, face the claw portion 7 with a gap.

In this regard, as shown in FIGS. 8 and 9, the gravity centers Ki, Ki of the through-holes 16 and 17 and the gravity centers Ko, Ko of the through-holes 26 and 27 are respectively offset (not coincident) relative to each other when the inner pad 11 is superimposed on the outer pad 21 in the disk axial direction. Therefore, the gravity center position Li of the contact area (regions marked with the dot patterns in FIG. 3) between the inner pad 11 and the piston 9 and the gravity center position Lo of the contact area (regions marked with the dot patterns in FIG. 6) between the outer pad 21 and the claw portion 7 can be adjusted as desired according to the amount of offset between the gravity centers Ki, Ki and Ko, Ko.

Figure 10:
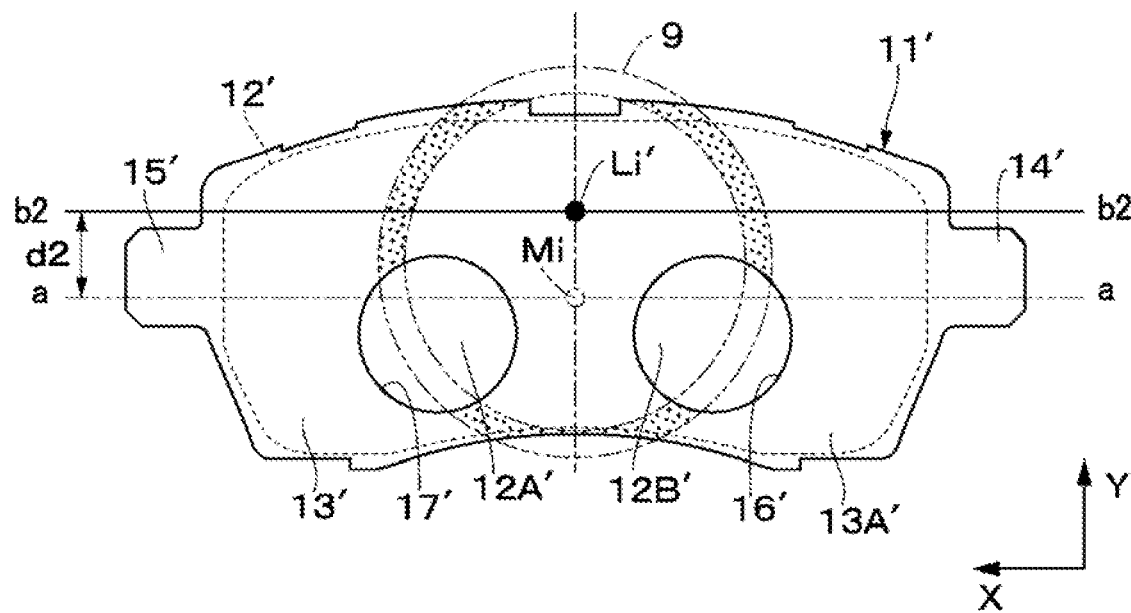
FIG. 10 is a side view showing an inner pad according to a comparative example.
Figure 11:
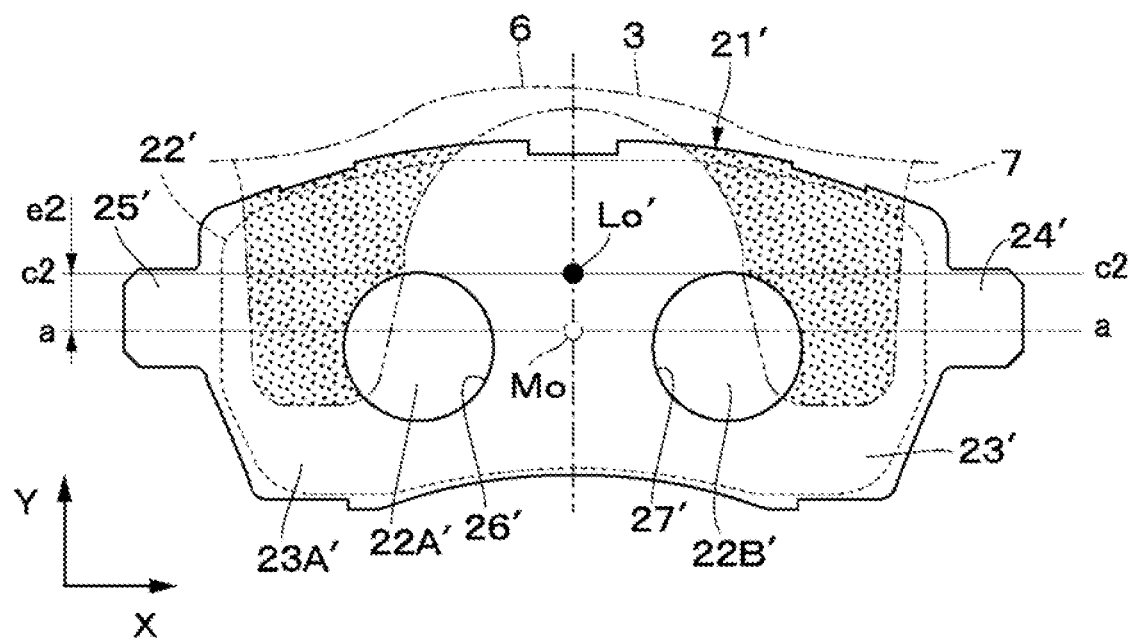
FIG. 11 is a side view showing an outer pad according to the comparative example.

For example, FIGS. 10 and 11 show a comparative example. Of the two drawings, FIG. 10 shows an inner pad 11' of the comparative example, and FIG. 11 shows an outer pad 21' of the comparative example. The inner pad 11' of the comparative example is the same as the inner pad 11 of the embodiment except or the positions of the through-holes 16' and 17' of the plate 13'. The outer pad 21' of the comparative example is the same as the outer pad 21 of the embodiment except for the positions of the through-holes 26' and 27' of the plate 23'. Therefore, in the comparative example, constituent elements common to the embodiment and the comparative example are denoted by the same reference signs as those used in the embodiment, with an apostrophe added thereto.

Comparing FIG. 10 with FIG. 3, the through-holes 16' and 17' in the inner pad 11' of the comparative example are located closer to the side (lower side in FIG. 10) opposite to the bridge portion 5 side in the Y-axis direction than the through-holes 16 and 17 in the inner pad 11 of the embodiment. In this case, the gravity center position Li' of the contact area (regions marked with the dot patterns in FIG. 10) between the inner pad 11' and the piston 9 in the comparative example is located closer to the bridge portion 5 side (upper side in FIG. 10) in the Y-axis direction than the gravity center position Li of the contact area between the inner pad 11 and the piston 9 in the embodiment. Thus, the gravity center positions Li and Li' can be adjusted as desired by adjusting the positions of the through-holes 16, 17, 16' and 17'.

It is assumed that the gravity center position of a disk contact surface of the inner pad 11 (11') which is a contact surface between the lining 12, 12' and the disk 1 is Mi, and a line passing through the gravity center position Mi and parallel to the X axis is a line segment a-a. Further, a line passing through the gravity center position Li of the contact area in the embodiment, i.e. the gravity center Li of an abutting surface of the plate 13 of the inner pad 11 that abuts against the piston 9 (opening end surface 9A thereof), and parallel to the X axis is assumed to be a line segment b1-b1. Further, a line passing, through the gravity center position Li' of the contact area in the comparative example, i.e. the gravity center Li' of an abutting surface of the plate 13' of the inner pad 11' that abuts against the piston 9 (opening end surface 9A thereof), and parallel to the X axis is assumed to be a line segment b2-b2.

In this case, when the brake is activated (during braking), the inner pad 11, 11' receives counterforce from the disk 1 to the lining 12, 12' side at the position of the line segment a-a. Meanwhile, the inner pad 11 of the embodiment receives the pressing load faun the piston 9 at the position of the line segment b1-b1. In contrast, the inner pad 11' of the comparative example receives the pressing load from the piston 9 at the position of the line segment b2-b2.

Here, comparing the distance d1 between the gravity center position Li (i.e. line segment b1-b1) of the contact area and the gravity center position Mi (i.e. line segment a-a) of the disk contact surface in the embodiment and the distance d2 between the gravity center position Li' (i.e. line segment b2-b2) of the contact area and the gravity center position Mi (i.e. line segment a-a) of the disk contact surface in the comparative example, the distance d1 in the embodiment can be made smaller than the distance d2 in the comparative example (d1<d2).

Thus, with the inner pad 11 of the embodiment, counterforce from the disk 1 side and counterforce from the piston 9 side can be brought closer to each other by an amount corresponding to the amount by which the distance d1 decreases, and it is possible for the lining 12 to have a tendency to wear uniformly in the Y-axis direction correspondingly. In contrast to this, with the inner pad 11' of the comparative example, counterforce from the disk 1 side and counterforce from the piston 9 side are apart from each other by an amount corresponding to the amount by which the distance d2 increases. Accordingly, the lining 12' may wear aggressively at the bridge portion 5 side (upper side in the figure) thereof in the Y-axis direction, for example. Thus, the inner pad 11 of the embodiment can suppress uneven wear of the lining 12 compared to the inner pad 11' of the comparative example.

Next, comparing FIG. 11 and FIG. 5, the through-holes 26' and 27' in the outer pad 21' of the comparative example are located closer to the side (lower side in FIG. 11) opposite to the bridge portion 5 side in the Y-axis direction than the through-holes 26 and 27 in the outer pad 21 of the embodiment. In this case, the gravity center position Lo' of the contact area (regions marked with the dot patterns in FIG. 11) between the outer pad 21' and the piston 9 in the comparative example is located closer to the bridge portion 5 side (upper side in FIG. 11) in the Y-axis direction than the gravity center position Lo of the contact area between the outer pad 21 and the piston 9 in the embodiment. Thus, the gravity center positions Lo and Lo' can be adjusted as desired by adjusting the positions of the through-holes 26, 27, 26' and 27'.

Here, it is assumed that the gravity enter position of a disk contact surface of the outer pad 21, 21' which is a contact surface between the lining 22, 22' and the disk 1 is Mo (=Mi), and a line passing through the gravity center position Mo and parallel to the X axis is a line segment a-a. Further, a line passing through the gravity center position Lo of the contact area in the embodiment, i.e. the gravity center Lo of an abutting surface of the plate 23 of the outer pad 21 that abuts against the claw portion 7, and parallel to the X axis is assumed to be a line segment c1-c1. Further, a line passing through the gravity center position Lo' of the contact area in the comparative example, i.e. the gravity center Lo' of an abutting surface of the plate 23' of the outer pad 21' that abuts against the claw portion 7, and parallel to the X axis is assumed to be a line segment c2-c2.

In this case, when the brake is activated (during braking), the outer pad 21, 21' receives counterforce from the disk 1 to the lining 22, 22' side at the position of the line segment a-a. Meanwhile, the outer pad 21 of the embodiment receives the pressing load from the claw portion 7 at the position of the line segment c1-c1. In contrast, the outer pad 21' of the comparative example receives the pressing load from the claw portion 7 at the position of the line segment c2-c2.

Here, comparing the distance e1 between the gravity center position Lo (i.e. line segment c1-c1) of the contact area and the gravity center position Mo (i.e. line segment a-a) of the disk contact surface in the embodiment and the distance e2 between the gravity center position Lo' (i.e. line segment, c2-c2) of the contact area and the gravity center position Mo (i.e. line segment a-a) of the disk contact surface in the comparative example, the distance e1 in the embodiment can be made smaller than the distance e2 the comparative example (e1<e2).

Thus, with the outer pad 21 of the embodiment, counterforce from the disk 1 side and counterforce from the claw portion 7 side can be brought closer to each other by an amount corresponding to the amount by which the distance e1 decreases, and it is possible for the lining 22 to have a tendency to wear uniformly in the Y-axis direction correspondingly. In contrast to this, with the outer pad 21' of the comparative example, counterforce from the disk 1 side and counterforce from the claw portion 7 side are apart from each other by an amount corresponding to the amount by which the distance e2 increases, and the lining 22' may wear aggressively at the bridge portion 5 side (upper side in the figure) thereof in the Y-axis direction for example. Accordingly, the outer pad 21 of the embodiment can suppress uneven wear of the lining 22 as compared to the outer pad 21' of the comparative example.

Thus, the gravity center position Li of the contact area (regions marked with the dot patterns in FIG. 3) of the inner pad 11 and the gravity center position Lo of the contact area (regions marked with the dot patterns in FIG. 6) of the outer pad 21 can be adjusted as desired by adjusting the positions of the gravity centers Ki, Ki of the through-holes 16 and 17 and the gravity centers Ko, Ko of the through-holed 26 and 27. In this case, according to the embodiment, it is unnecessary to provide an intervening member, e.g. a shim plate with a cut-out portion, between the inner pad 11 and the piston 9 and another intervening member between the outer pad 21 and the claw portion 7 and hence possible to reduce cost and to improve productivity (ease of production).

In the embodiment, the first and second holes for adjusting the gravity center positions Li and Lo of the contact areas of the inner and outer pads 11 and 21 are the through-holes 16 and 17 and the through-holes 26 and 27, respectively, which serve as gas vent holes for venting gas from the linings 12 and 22 when the linings 12 and 22 and the plates 13 and 23 are fixed to each other, respectively. In this regard, the through-holes 16 and 17 and the through-holes 26 and 27 are holes originally provided in the inner pad 11 and the outer pad 21, respectively. Therefore, there is no need to provide new holes as first and second holes in the inner and outer pads 11 and 21. From this point of view also, it is possible to reduce cost and to improve productivity.

According to the embodiment, the arrangement is such that the gravity centers Ki, Ki of the through-holes 16 and 17 as first holes are respectively offset in the Y-axis direction relative to the gravity centers Ko, Ko of the through-holes 26 and 27 as second holes. Thus, the gravity center position Li of the contact area between the inner pad 11 and the piston 9 (opening end surface 9A thereof) and the gravity center position Lo of the contact area between the outer pad 21 and the claw portion 7 can be adjusted in the Y-axis direction as desired according to the amount of offset in the Y-axis direction between the gravity centers Ki, Ki of the through-holes 16 and 17 and the gravity centers Ko, Ko of the through-holes 26 and 27.

According to the embodiment, the gravity centers Ko, Ko of the through-holes 26 and 27 as second holes are located closer to the bridge portion 5 side (upper side in FIGS. 1 to 9) of the caliper 3 in the Y-axis direction (up-and-down direction in FIGS. 1 to 9) than the gravity centers Ki, Ki of the through-holes 16 and 17 as first holes. Here, the claw portion 7 extends in the Y-axis direction and away from the bridge portion 5 (i.e. downward in FIGS. 1 to 9), with the bridge portion 5 side defined as the proximal end side thereof. Therefore, the gravity center position Lo of the contact area between the outer pad 21 and the claw portion 7 is likely to be located on the bridge portion 5 side in the Y-axis direction as compared to the gravity center position Li of the contact area between the inner pad 11 and the piston 9 (opening end surface 9A thereof).

In this regard, the gravity center position Lo of the contact area between the outer pad 21 and the claw portion 7 can be adjusted away from the bridge portion 5 side by positioning the gravity centers Ko, Ko of the through-holes 26 and 27 closer to the bridge portion 5 side than the gravity centers Ki, Ki of the through-holes 16 and 17. Thus, the gravity center position Lo of the contact area between the outer pad 21 and the claw portion 7 and the gravity center position Li of the contact area between the inner pad 11 and the piston 9 (opening end surface 9A thereof) can be brought closer to each other (ultimately can be made coincident with each other) in the Y-axis direction. As a result, the lining 22 of the outer pad 21 and the lining 12 of the inner pad 11 are allowed to have the same tendency to wear out.

Figure 12:
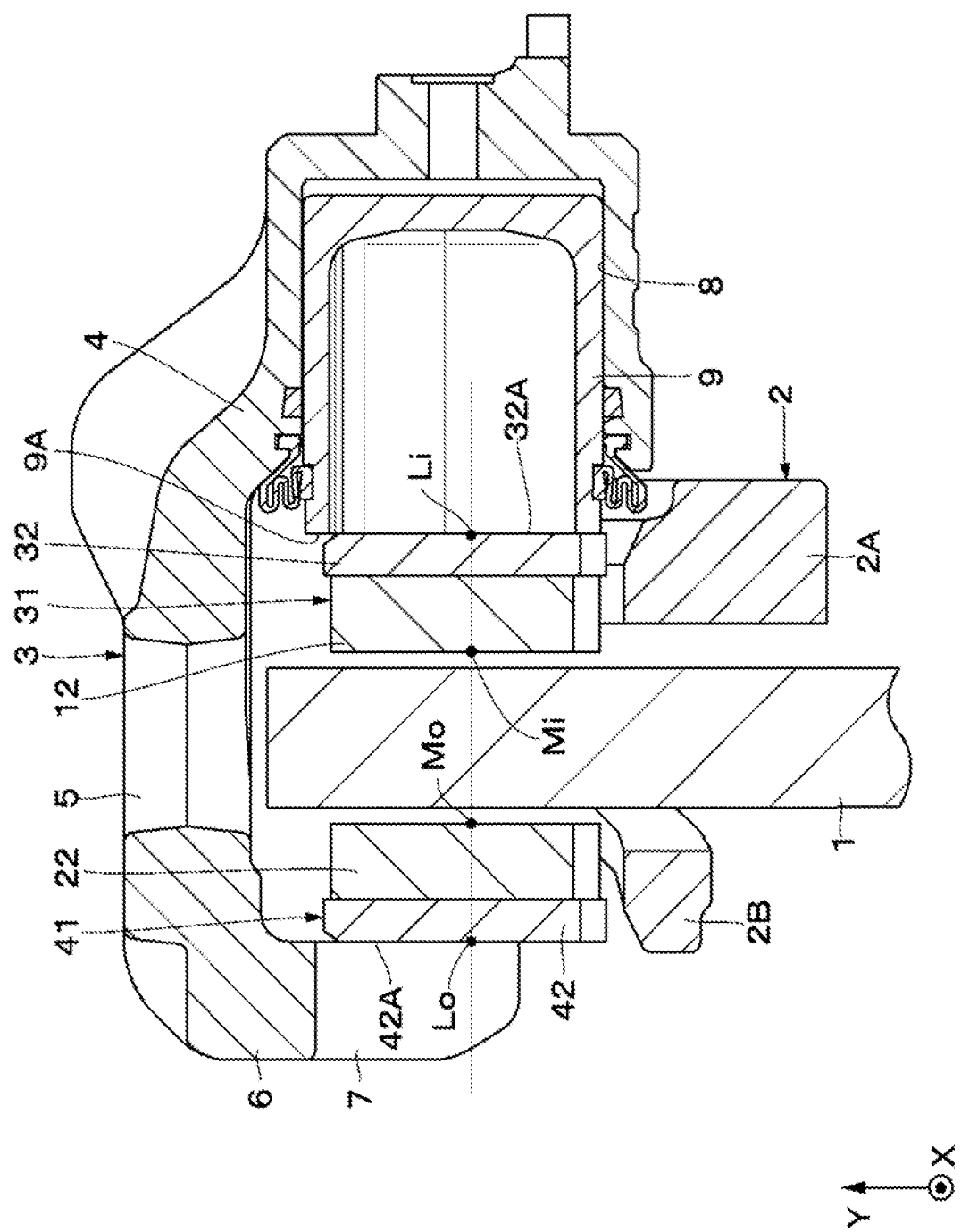
FIG. 12 is a vertical sectional view showing a disk brake according to a second embodiment.
Figure 13:
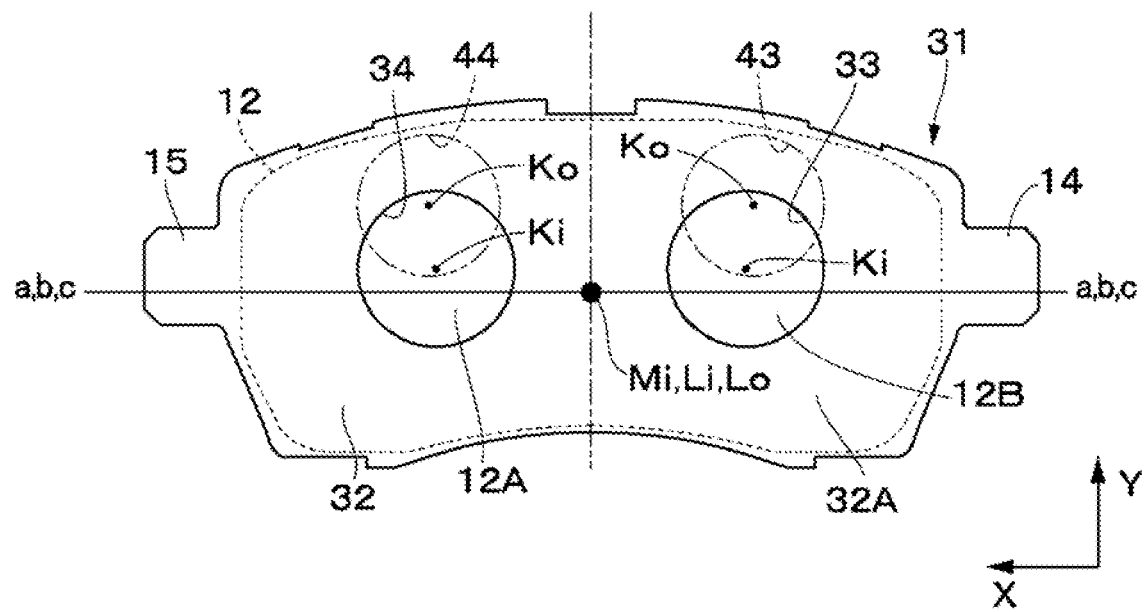
FIG. 13 is a side view showing second holes in an outer pad as projected onto an inner pad.
Figure 14:
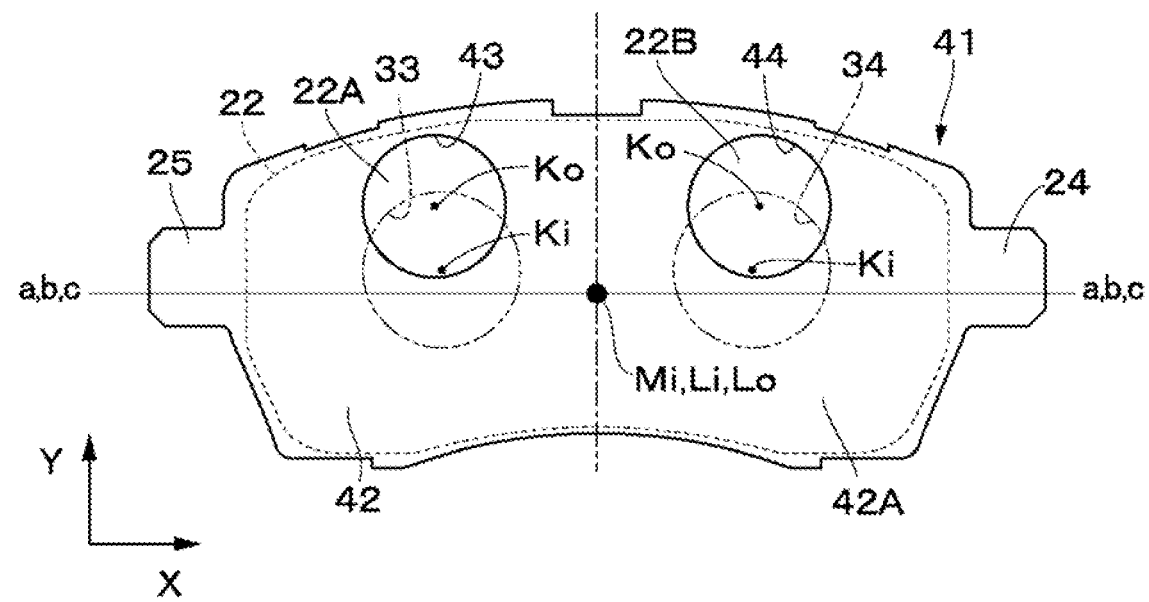
FIG. 14 is a side view showing first holes in the inner pad as projected onto the outer pad.

Next, FIGS. 12 to 14 show a second embodiment. The feature of the second embodiment resides in that the gravity center of the abutting surface (contact area) of the plate of the inner pad that abuts against the piston, the gravity center of the abutting surface (contact area) of the plate of the outer pad that abuts against the claw portion, and the gravity centers of the contact surfaces (contact areas) between the linings of the inner and outer pads and the disk are made coincident with each other in the Y-axis direction. In the second embodiment, the same constituent elements as those of the above-described first embodiment are denoted by the same reference signs as those used in the first embodiment, and a description thereof is omitted.

An inner pad 31 of the second embodiment is the same as the inner pad 11 of the first embodiment except that the positions of through-holes 33 and 34 in a plate 32 are different from the positions of the through-holes 16 and 17 in the plate 13 of the first embodiment. More specifically, in the second embodiment, the through-holes 33 and 34 in the inner pad 31 are provided more remote (lower) from the bridge portion 5 than the through-holes 16 and 17 in the first embodiment and closer (upper) to the bridge portion 5 side than the through-holes 16' and 17' in the comparative example.

An outer pad 41 of the second embodiment is also the same as the outer pad 21 of the first embodiment except that the positions of through-holes 43 and 44 in a plate 42 are different from the positions of the through-holes 26 and 27 in the plate 23 of the first embodiment. More specifically, in the second embodiment, the through-holes 43 and 44 in the outer pad 41 are provided closer (upper) to the bridge portion 5 side than the through-holes 26 and 27 in the first embodiment and, the through-holes 26' and 27' in the comparative example.

In this case, the second embodiment is also arranged such that when the inner pad 31 is projected onto the outer pad 41 in the disk axial direction, the gravity centers (centroids, or centers) Ki, Ki of the through-holes 33 and 34 as first holes and the gravity centers (centroids, or centers) Ko, Ko of the through-holes 43 and 44 as second holes are respectively offset relative to each other, in the same way as the first embodiment. In FIG. 13, the inner pad 31 (plate 32 thereof) is shown by the solid line, and the through-holes 43 and 44 in the outer pad 41 when the inner pad 31 and the outer pad 41 are projected in the disk axial direction are shown by the two-dot chain line. In FIG. 14, on the other hand, the outer pad 41 (plate 42 thereof) is shown by the solid line, and the through-holes 33 and 34 in the inner pad 31 when the outer pad 41 and the inner pad 31 are projected in the disk axial direction are shown by the two-dot chain line.

The second embodiment is also arranged such that, when the inner pad 31 is projected onto the outer pad 41 in the disk axial direction, the gravity centers Ko, Ko of the through-holes 43 and 44 as second holes are located closer to the bridge portion 5 side of the caliper 3 in the Y-axis direction (i.e. closer to the upper side in FIGS. 13 and 14) than the gravity centers Ki, Ki of the through-holes 33 and 34 as first holes, in the same way as the first embodiment. In addition, the second embodiment is arranged such that, when the inner pad 31 is projected onto the outer pad 41 in the disk axial direction, the gravity center position (centroid position, or center position) Li of the contact area between the inner pad 31 and the piston 9 (opening end surface 9A thereof), the gravity center position (centroid position, or center position) Lo of the contact area between the outer pad 41 and the claw portion 7, and the gravity center positions Mi and Mo of disk contact surfaces of the inner and outer pads 31 and 41 which are contact surfaces between the linings 12 and 22 and the disk 1 are coincident with each other in the Y-axis direction.

In other words, the arrangement is as follows. It is assumed that a line passing through the gravity center positions Mi and Mo of the disk contact surfaces and parallel to the X axis is a line segment a-a. Further, a line passing through the gravity center Li of the abutting surface of the plate 32 of the inner pad 31 that abuts against the piston 9 (opening end surface 9A thereof) and parallel to the X axis is assumed to, be a line segment b-b, and a line passing through the gravity center Lo of the abutting surface of the plate 42 of the outer pad 41 that abuts against the claw portion 7 and parallel to the X axis is assumed to be a line segment c-c. With this assumption, the through-holes 33 and 34 as first holes and the through-holes 43 and 44 as second holes are disposed so that, when the inner pad 31 is projected onto the outer pad 41 in the disk axial direction, the line segments a-a, b-b and c-c are coincident with each other.

The disk brake according to the second embodiment is configured to make the line segments a-a, b-b and c-c coincident with each other by using the above-described inner and outer pads 31 and 41. The basic operation of the second embodiment is not particularly different from that of the above-described first embodiment.

Particularly, in the second embodiment, the through-holes 33, 34, 43 and 44 are disposed so that the line segments a-a, b-b and c-c are coincident with each other. With this arrangement, it is possible to suppress uneven wear of both the lining 22 of the outer pad 41 and the lining 12 of the inner pad 31. As a result, brake noise due to uneven wear can be suppressed.

In the first embodiment, the present invention has been explained taking as an example a case where the inner pad 11 has two through-holes 16 and 17 as first holes and the outer pad 21 has two through-holes 26 and 27 as second holes. However, the present invention is not limited to the above-described arrangement. For example, the inner pad may be provided with one first hole or three or more first holes. The outer pad may also be provided with one second hole or three or more second holes, for example. Further, the number of first holes and the number of second holes may be different from each other. This applies similarly to the second embodiment In the first embodiment, the present invention has been explained taking as an example a case where the through-holes 16 and 17 as first holes and the through-holes 26 and 27 as second holes are holes with a circular sectional configuration. However, the present invention is not limited thereto. The first and second holes may be holes with a non-circular sectional configuration, e.g. an oval, elliptic, rectangular, C-shaped, U-shaped, J-shaped, or segmental annular sectional configuration. This applies similarly to the second embodiment.

In the first embodiment, the present invention has been explained taking as an example a case where the through-holes 16 and 17 as first holes are arranged in symmetry with respect to the center in the disk rotational direction of the inner pad 11 (i.e. in line symmetry with respect to a line passing through the center and parallel to the Y axis). The through-holes 26 and 27 as second boles are also arranged in symmetry with respect to the center in the disk rotational direction of the outer pad 21 (i.e. in line symmetry with respect to a line passing through the center and parallel to the Y axis). However, the present invention is not limited thereto. Either or both of a plurality of first holes and a plurality of second holes may be arranged in asymmetry.

That is, either or both of a plurality of first holes and a plurality of;second holes may be offset in either or both of the disk radial direction and the disk rotational direction on both sides of the center in the disk rotational direction of the associated friction pad. Further, when the number of either or both of first and second holes is one, the center (gravity center, or centroid) of the one hole may be offset in either or both of the disk radial direction and the disk rotational direction from the center in the disk rotational direction of the associated friction pad.

In the first embodiment, the present invention has been explained taking as an example a case where the first holes and the second holes are the through-holes 16 and 17 and the through-holes 26 and 27, respectively, which serve as gas vent holes for venting gas from the linings 12 and 22 when the linings 12 and 22 and the plates 13 and 23 are fixed to each other, respectively. However, the present invention is not limited thereto. The first holes and the second holes may be provided as holes different from the gas vent holes. In such a case, the first holes and the second holes may be through-holes extending through the associated plates. Alternatively, the first and second holes may be bottomed recessed holes (bottomed holes) each having a bottom. This applies similarly to the second embodiment.

In the first embodiment, the present invention has been explained taking as an example a case where a single piston 9 is provided in the inner leg portion 4 of the caliper 3. However, the present invention is not limited thereto. For example, two pistons may be provided in the inner leg portion of the caliper to form a twin-bore structure. Alternatively, three pistons may be provided in the inner leg portion of the caliper. This applies similarly to the second embodiment.

Further, the embodiments are illustrative, and the constituent features shown in the different embodiments may be partially replaced or combined as a matter of course.

According to the above-described embodiments, it is possible to reduce cost and to improve productivity (ease of production).

Disk brakes based on the above-described embodiments are deemed to include those of the following aspects, for example. That is, a disk brake of a first aspect includes a caliper formed to extend over an outer periphery side of a disk rotating together with a wheel, an inner pad and an outer pad which are configured to press the disk, a piston configured to press the inner pad, and a claw portion configured to press the outer pad. The inner pad includes a first surface that contacts the disk when the inner pad presses the disk. The inner pad further includes a second surface opposite to the first surface. The second surface has at least one First hole. The outer pad includes a third surface that contacts the disk when the outer pad presses the disk. The outer pad further includes a fourth surface opposite to the third surface. The fourth surface has at least one second hole. The at least one first hole and the at least one second hole are disposed so that, when the inner pad is projected onto the outer pad in an axial direction of the disk, a center of gravity of the at least one first hole and a center of gravity of the at least one second hole are offset relative to each other. Accordingly, the gravity center position of the contact area between the inner pad and the piston (i.e. the gravity center position of the abutting surface) and the gravity center position of the contact area between the outer pad and the claw portion (i.e. the gravity center position of the abutting surface) can be adjusted as desired according to the offset between the gravity center of the first hole and the gravity center of the second hole. In this case, there is no need to provide an intervening member, e.g. a shim plate provided with a cut-out portion, between the inner, pad and the piston and another intervening member between the outer pad and the claw portion. Therefore, it is possible to reduce cost and to improve productivity.

As a second aspect, in the first aspect, the inner pad includes a first lining forming the first surface and a first plate forming the second surface. The outer pad includes a second lining forming the third surface and a second plate forming the fourth surface. The at least one first bole and the at least one second hole are gas vent holes for venting gas from the first lining and the second lining when the first lining and the first plate are fixed to each other and when the second lining and the second plate are fixed to each other. In this regard, the gas vent holes are holes originally provided in the inner pad and the outer pad. Therefore, there is no need to provide new holes as first and second holes in the inner and outer pads. From this point of view also, it is possible to reduce cost and to improve productivity.

As a third aspect, in the second aspect, when a direction that connects lug portions provided at the opposite sides, respectively, of the inner pad to receive rotational torque and a direction that connects lug portions provided at the opposite sides, respectively, of the outer pad to receive rotational torque are each defined as an X axis, and when a direction perpendicular to the X axis in the second and fourth surfaces of the first and second plates is defined as a Y axis, the gravity center of the at least one first hole is offset in the Y-axis direction relative to the gravity center of the at least one second hole. Thus, it is possible to adjust, as desired, the gravity center position of the contact area between the inner pad and the piston and the gravity center position of the contact area between the outer pad and the claw portion, in the Y-axis direction.

As a fourth aspect, in the third aspect, the gravity center of the at least one second hole is located closer to the bridge side of the caliper than the gravity center of the at least one first hole in the Y-axis direction. Here, the claw portion extends in the Y-axis direction and away from the bridge, with the bridge side defined as the proximal end side thereof. Therefore, the gravity center position of the contact area between the outer pad and the claw portion is likely to be located on the bridge side in the Y-axis direction as compared to the gravity center position of the contact area between the inner pad and the piston.

In this regard, the gravity center position of the contact area between the outer pad and the claw portion can be adjusted away from the bridge side by positioning the gravity center of the second hole closer to the bridge side than the gravity center of the first hole. Thus, the gravity center position of the contact area between the outer pad and the claw portion and the gravity center position of the contact area between the inner pad and the piston can be brought closer to each other (ultimately can be made coincident with each other) in the Y-axis direction. As a result, the fining of the outer pad and the lining of the inner pad are allowed to have the same tendency to wear out.

As a fifth aspect, in the third aspect, the at least one first hole and the at least one second hole are disposed so that, when the inner pad is projected onto the outer pad in the disk axial direction, a line passing through a gravity center of an abutting surface of the first plate abutting against the piston and parallel to the X axis, a line passing through a gravity center of an abutting surface of the second plate abutting against the claw portion and parallel to the X axis, and lines passing through the respective gravity centers of the first and third surfaces and parallel to the X axis are coincident with each other. With this arrangement, it possible to suppress uneven wear of both the lining of the outer pad and the lining of the inner pad. As a result, brake noise due to uneven wear can be suppressed.

Although some embodiments of the present invention have been described above, the described embodiments of the present invention are for the purpose of facilitating the understanding of the present invention and are not intended to limit the present invention. The present invention may be modified and improved without departing from the gist thereof, and the present invention includes equivalents thereof. In addition, the structural elements described in the claims and the specification can be arbitrarily combined or omitted within a range in which the above-mentioned problems are at least partially solved, or within a range in which at least a part of the advantages is achieved.

The present application claims priority to Japanese Patent Application No. 2015-131325 filed on Jun. 30, 2015. The entire disclosure of Japanese Patent Application No. 2015-131325 filed on Jun. 30, 2015 including the specification, the claims, the drawings, and the summary is incorporated herein by reference in its entirety.

REFERENCE SIGNS LIST 1 disk; 3 caliper; 5 bridge portion (bridge); 7 claw portion; 9 piston; 11, 31 inner pad; 12 lining; 13, 32 plate; 13A, 32A side surface (surface on non-contacting side); 14, 15 lug portion; 16, 17, 33, 34 through-hole (first hole); 21 outer pad; 22 lining; 23, 42 plate; 23A, 42A side surface (surface on non-contacting side); 24, lug portion; 26, 27, 43, 44 through-hole (second hole); a, b, c parallel lines.

The invention claimed is:

1. A disk brake comprising:
a caliper formed to extend over an outer periphery side of a disk rotating together with a wheel;
an inner pad and an outer pad which are configured to press the disk;
a piston having an open end surface configured to press the inner pad; and
a claw portion configured to press the outer pad;
wherein the inner pad includes a first surface that contacts the disk when the inner pad presses the disk, and a second surface opposite to the first surface,
the second surface has at least one first hole,
the outer pad includes a third surface that contacts the disk when the outer pad presses the disk, and a fourth surface opposite to the third surface,
the fourth surface has at least one second hole, and
the at least one first hole and the at least one second hole are disposed so that, when the inner pad is projected onto the outer pad in an axial direction of the disk, a center of the at least one first hole and a center of the at least one second hole are offset relative to each other,
wherein the inner pad includes a first lining forming the first surface, and a first plate forming the second surface,
wherein the outer pad includes a second lining forming the third surface, and a second plate forming the fourth surface,
wherein the at least one first hole and the at least one second hole extend through the first plate and the second plate, respectively
wherein the first lining includes a projection that is received in the at least one first hole, and the second lining includes a projection that is received in the at least one second hole,
wherein an end surface of the projection of the first lining, which partly enters the first hole, is recessed from the second surface of the first plate,
wherein, during a braking operation, the opening end surface of the piston contacts the second surface of the inner pad except at the at least one first hole, and
wherein the opening end surface of the piston faces, but does not contact, the end surface of the projection of the first lining.

2. The disk brake of claim 1, wherein, when a direction that connects lug portions provided at opposite sides, respectively, of the inner pad to receive rotational torque and a direction that connects lug portions provided at opposite sides, respectively, of the outer pad to receive rotational torque are each defined as an X axis, and a direction perpendicular to the X axis in the second and fourth surfaces of the first and second plates is defined as a Y axis, the center of the at least one first hole is offset in the Y-axis direction relative to the center of the at least one second hole.

3. The disk brake of claim 2, wherein the center of the at least one second hole is located closer to a bridge side of the caliper than the center of the at least one first hole in the Y-axis direction.

4. The disk brake of claim 2, wherein the at least one first hole and the at least one second hole are disposed so that, when the inner pad is projected onto the outer pad in the axial direction of the disk, a line passing through a center of an abutting surface of the first plate abutting against the piston and parallel to the X axis, a line passing through a center of an abutting surface of the second plate abutting against the claw portion and parallel to the X axis, and lines passing through respective centers of the first and third surfaces and parallel to the X axis are coincident with each other.

* * * * *